April 19, 1927. 1,625,117
R. GOLLERT
MANUFACTURE OF SEMISOLID RUBBER TIRES
Filed Dec. 14, 1926
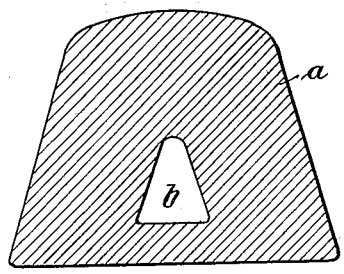
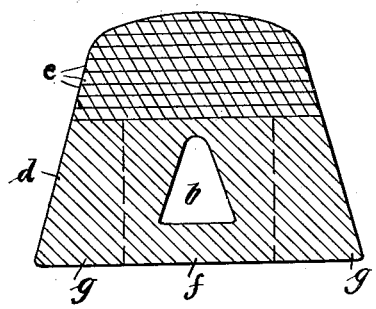
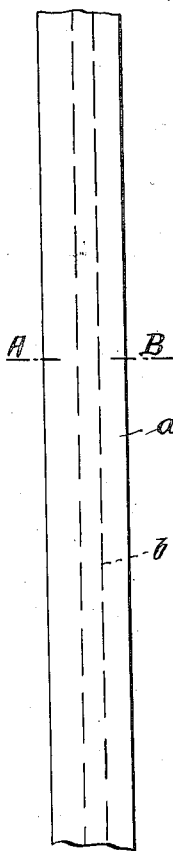
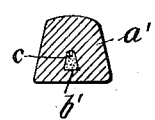
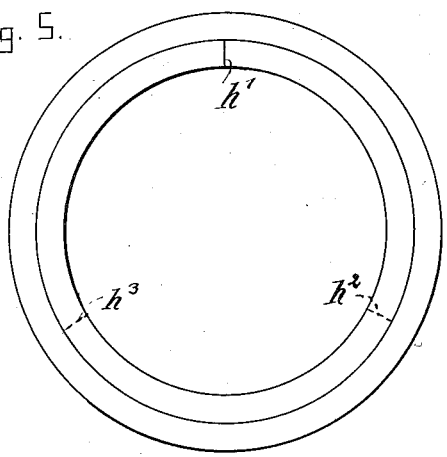
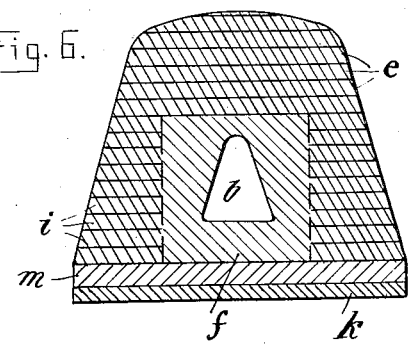
INVENTOR
Reinhold Gollert
by Langner, Parry, Card & Langner
Attys.

Patented Apr. 19, 1927.

1,625,117

UNITED STATES PATENT OFFICE.

REINHOLD GOLLERT, OF CHARLOTTENBURG, GERMANY.

MANUFACTURE OF SEMISOLID RUBBER TIRES.

Application filed December 14, 1926, Serial No. 154,797, and in Germany August 5, 1925.

This invention relates to the manufacture of semi-solid rubber tires and its main object is to produce a tire, the hollow portion of which is surrounded on all sides by a uniform rubber mass, without joints or openings, and which can be vulcanized on to the entire peripheral surface of the felly of a wheel.

The invention attains this object by using for the filling of the hollow space, powdered material preferably having lubricating properties, which does not change its shape under the action of compression and heat, as for example, talcum, graphite, or the like.

The powder filling, after the tire has been vulcanized on to the felly, is withdrawn through a few small holes left for that purpose.

The tire thus obtained possesses excellent working characteristics, consistency and grip on the felly.

The use of cores of powdered material for rubber tires is well known, but such material was not filled in as a loose powder, but was used only in the form of sand, bound together in segment form by a binding medium and introduced into a rubber mass having in the base a large peripheral slot causing a corresponding reduced gripping surface between the tire and the felly.

In conjunction with the above novel features the invention also resides in the formation of the rubber-body by a known composite construction according to which there is first made a hollow inside rubber core and then the sides and top surface of the tire are built round this core, whereupon all the parts are vulcanized together.

Various constructional forms of the improved tires are diagrammatically shown by way of example in the accompanying drawings, in which:—

Fig. 1 is a section through one form of the improved tire.

Fig. 2 is a partial view on a small scale of the linear product used in making the tire.

Fig. 3 is a section on the line A—B of Fig. 2.

Fig. 4 is a section of a modified form of tire.

Fig. 5 is a side elevation on a smaller scale of the tire shown in Fig. 4.

Fig. 6 is a section of a further modification.

This tire $a$ (Fig. 1) has a hollow $b$ of triangular shape, for example.

According to Figs. 1–3, at first an open or linear rubber body $a'$ having the section shown in Fig. 1 with a hollow space $b'$, is made by the extrusion or pressing process or by building up in layers for example. The space $b'$ is then tightly filled with a lump-free powdered mass, such as talcum. During the filling, the still relatively delicate raw rubber-body is best held on a plank vertically, and shaken in order to cause the powder filling to sink down. The packing can be carried out mechanically. Such a filling does not expand and does not change its position through irregular initial pressure of the vulcanizing press.

When the filling is finished, the rod like outer portion $a'$ is formed in the usual way into a ring, having transverse, overlapping or interlocking joints, and is then brought onto the felly of a wheel and vulcanized. During vulcanizing the filling $c$ keeps the hollow space open, and does not become compressed or displaced by unequal pressure of the press mould.

After vulcanization the filling $c$ is withdrawn through a few holes left in the felly or other under portion of the tire, for example, by compressed air or air suction.

As in previous attempts with solid tires, it was found that the unavoidable transverse joints of such circular manufacture, caused a dangerous defect, it is preferable to employ the new method in the manner shown in Figs. 4–6.

The tire base $d$ shown as a whole in Fig. 4, is manufactured as described above and is then filled and joined to make a transversely joined ring. Over this ring the head of the tire is then built up of the usual spiral jointless layers $e$ wound one over the other. Thus a secure covering and jointing of the transverse joints of the tire is effected.

As, however, the amalgamation of the tire base alone into the closed ring still presents considerable difficulties, it is preferable to proceed as follows:—

A central base piece $f$ which, for example, is square in shape, is made with the hollow space shown in Fig. 2. This can be relatively easily joined into a closed ring. On both sides of this central piece trapezium shaped side members $g$ are fixed, which may also be linear spewed members and these are then joined to the ring. In this construction, the joints $h'$, $h^2$, $h^3$ of these layers are staggered circumferentially, so that each joint is secured by the overlapping adjoining members.

The tire base can obviously also be made in more than three pieces.

With this sectional method of manufacture, owing to the simple formation of the parts, the latter can be easily rolled and pressed together.

The embodiment shown in Fig. 6 differs from that of Fig. 4 only in that, instead of the moulded side members $g$, spirally wound layers $i$ are used.

With the new tires fully normal sized fellies can be used.

In Fig. 6 the single piece felly $k$ is shown, which is vulcanized to the tire by means of an interposed layer $m$ of hard rubber.

A great advantage of the new tires is that the hollow space is surrounded by a uniform rubber body, which even on the inside is not slit, which is correspondingly durable and which, for vulcanizing on to the undivided and therefore strong felly, offers a large unbroken surface, so that a very firm and durable joint of tire and felly is obtained.

The few small holes necessary for blowing or washing out the core can easily be made air tight subsequently, so that the air retained in the hollow space in the tire cannot escape and acts as a form of spring support.

Air or gas may be forced through one of these holes so that a somewhat pneumatic effect is produced. With tires with slit bases or inner parts, the above effects were much more difficult, or even impossible to obtain.

I claim:

1. A method of manufacturing semi-solid tires which consists in forming a rubber body with a totally enclosed hollow space therein, filling said hollow space with a lump-free powdered mass, and forming said rubber body with its enclosed powdered mass into a ring, so that the resultant rubber body is adapted to be vulcanized to the felly of a wheel, preferably over the whole peripheral surface thereof, the powdered mass constituting the core being afterwards withdrawn through small holes.

2. A method of manufacturing semi-solid tires which consists in forming an unvulcanized rubber body with a totally enclosed hollow space therein, filling said hollow space with a lump-free powdered mass, forming said rubber body with its enclosed powdered mass into a ring, and forming over said body an outer rubber ring without transverse joints, so that the resultant rubber body is adapted to be vulcanized together and to the felly of a wheel, preferably to the whole peripheral surface thereof, the powdered mass constituting the core being afterwards withdrawn through small holes provided for that purpose.

3. A method of manufacturing semi-solid tires, which consists in forming an unvulcanized rubber body with a totally enclosed hollow space therein, filling said hollow space with a lump-free powdered mass, forming said rubber body with its enclosed powdered mass into a ring, connecting rubber rings to the sides of said body, and forming over the resultant body an outer rubber ring without transverse joints, so that the resultant rubber ring is adapted to be vulcanized together and to the felly of a wheel, preferably to the whole peripheral surface thereof, the powdered mass constituting the core being afterwards withdrawn through small holes.

4. A method of manufacturing semi-solid tires as claimed in claim 3, in which the inner rubber rings have transverse joints arranged in staggered relation.

5. A method of manufacturing semi-solid tires as claimed in claim 1, in which the lump-free powdered mass is such as to be easy-flowing, and not liable to expand or change under compression and heat action and having lubricating properties.

6. A method of manufacturing semi-solid tires as claimed in claim 1, in which the lump-free powdered mass consists of talcum.

7. A method of manufacturing semi-solid tires which consists in forming an unvulcanized rubber body with a totally-enclosed hollow space therein, filling said hollow space with a lump-free powdered mass, forming said rubber body with its enclosed powdered mass into a ring, vulcanizing the resultant rubber body to the felly of a wheel, preferably over the whole peripheral surface thereof, providing a few holes of small diameter through the inner surface of said tire, and withdrawing the powdered mass constituting the core through said holes.

8. A method of manufacturing semi-solid tires as claimed in claim 8, in which when vulcanizing a layer of hard rubber is interposed between the felly and the rubber body enclosing the powdered mass.

9. A method of manufacturing semi-solid tires as claimed in claim 8, in which the holes are subsequently hermetically sealed.

10. A method of manufacturing semi-solid tires as claimed in claim 8, in which the hollow space in the tire is filled with a compressed gas.

In testimony whereof I affix my signature.

REINHOLD GOLLERT.

CERTIFICATE OF CORRECTION.

Patent No. 1,625,117.                      Granted April 19, 1927, to

REINHOLD GOLLERT.

It is hereby certified that error appears in the printed specification of the above numbered patent requiring correction as follows: Page 2, lines 112, 117 and 120, claims 8, 9 and 10 respectively, for "claim 8" read "claim 7"; and that the said Letters Patent should be read with this correction therein that the same may conform to the record of the case in the Patent Office.

Signed and sealed this 24th day of May, A. D. 1927.

M. J. Moore,
Seal.                                Acting Commissioner of Patents.